US008015229B2

(12) United States Patent
Strøm et al.

(10) Patent No.: US 8,015,229 B2
(45) Date of Patent: Sep. 6, 2011

(54) APPARATUS AND METHOD FOR PERFORMING EFFICIENT MULTIPLY-ACCUMULATE OPERATIONS IN MICROPROCESSORS

(75) Inventors: Øyvind Strøm, Trondheim (NO); Erik Knutsen Renno, Trondheim (NO)

(73) Assignee: Atmel Corporation, San Jose, CA (US)

( * ) Notice: Subject to any disclaimer, the term of this patent is extended or adjusted under 35 U.S.C. 154(b) by 1148 days.

(21) Appl. No.: 11/142,920

(22) Filed: Jun. 1, 2005

(65) Prior Publication Data
US 2006/0277241 A1 Dec. 7, 2006

(51) Int. Cl.
*G06F 7/38* (2006.01)

(52) U.S. Cl. ...................................... 708/523

(58) Field of Classification Search .................. 708/501, 708/523, 603
See application file for complete search history.

(56) References Cited

U.S. PATENT DOCUMENTS

| | | | |
|---|---|---|---|
| 4,648,059 A | 3/1987 | Gregorcyk | |
| 4,761,759 A | 8/1988 | Nakagawa | |
| 4,849,921 A | 7/1989 | Yasumoto et al. | |
| 4,953,115 A | 8/1990 | Kanoh | |
| 5,128,890 A * | 7/1992 | Girardeau, Jr. | 708/625 |
| 5,148,386 A | 9/1992 | Hori | |
| 5,305,249 A | 4/1994 | Yoshida | |
| 5,563,813 A | 10/1996 | Chen et al. | |
| 5,610,850 A | 3/1997 | Uratani et al. | |
| 5,666,300 A * | 9/1997 | Adelman et al. | 708/521 |
| 5,793,655 A | 8/1998 | Harlap et al. | |
| 5,835,389 A | 11/1998 | Wong | |
| 5,944,771 A | 8/1999 | Shiraishi | |
| 5,956,747 A * | 9/1999 | Wilhelm et al. | 711/140 |
| 5,957,996 A | 9/1999 | Shiraishi | |
| 5,991,785 A * | 11/1999 | Alidina et al. | 708/207 |
| 6,473,529 B1 | 10/2002 | Lin | |
| 2003/0115416 A1 | 6/2003 | Nixon et al. | |
| 2004/0225838 A1* | 11/2004 | Biles | 711/118 |

FOREIGN PATENT DOCUMENTS

| | | |
|---|---|---|
| EP | 1 367 511 A2 | 3/2003 |
| JP | 01 213719 A | 8/1989 |
| WO | WO-2006/129189 A2 | 12/2006 |

OTHER PUBLICATIONS

Mourelle, Luiza et al., "Codesign System Performance Based on Memory Configurations," Proceedings of the XII Symposium on Integrated Circuits and System Design, Sep. 29, 1999, pp. 36-41, IEEE Computing Soc., Los Alamitos, CA USA.
Corresponding International Patent Application No. PCT/IB2006/001464, International Search Report, Feb. 20, 2007, 4 pages.
"Chinese Application Serial No. 200680018874.3 Office Action mailed Jun. 4, 2009", 5 pgs.
"International Application Serial No. PCT/IB2006/001464, Written Opinion mailed Feb. 20, 2007", 6 pgs.

* cited by examiner

*Primary Examiner* — Chuong D Ngo
(74) *Attorney, Agent, or Firm* — Fish & Richardson P.C.

(57) ABSTRACT

An apparatus for performing multiply-accumulate operations in a microprocessor comprising operand input registers for receiving data to be operated on an adder and a multiplier for performing operations on the data, a result output port for presenting results to the microprocessor, a multiplexer for storing results, an accumulator cache for storing an accumulator value internal to the apparatus, and control circuitry for controlling the operation of the apparatus.

13 Claims, 6 Drawing Sheets

APPARATUS AND METHOD FOR PERFORMING EFFICIENT MULTIPLY-ACCUMULATE OPERATIONS IN MICROPROCESSORS

FIELD OF THE INVENTION

This invention relates to microprocessors. More particularly, this invention relates to an apparatus and method for performing efficient multiply-accumulate operations.

PRIOR ART

It is becoming more common to allow microprocessors to perform digital signal processing (DSP). A very common operation in DSP is the multiply-accumulate (MAC) operation. The MAC operation involves multiplying two operands X and Y, and adding the product to another operand, the accumulator A.

In many cases, the accumulator A is wider than the width of X and Y in order to keep A from overflowing. Since the same accumulator is reused in the entire DSP algorithm, a greater locality-of-reference yields for the accumulator A.

Making the MAC operation as efficient as possible is crucial for DSP performance, since the operation is frequently used in inner loops. It is also very advantageous to allow the accumulator to be wide enough to keep the result from overflowing. This allows for increased precision in the calculations. Often, a wide accumulator is only needed for intermediate results during a calculation as the final result may be rounded and presented in a single register.

Modern microprocessor architectures prefer to keep operands in the register file. A common scenario is to keep operand X, operand Y, and operand A in three separate registers in the register file. Therefore, reading three word-sized operands X, Y, and A will require three register file read operations.

Often greater accuracy is needed, requiring operand A to reside in two or more concatenated registers in the register file. This will result in four or more register file read operations that have to be performed per operation. This will either require four or more expensive read ports in terms of silicon area. Alternatively, the operation can be implemented by read operations that read out the register file sequentially and thereby degrade the performance. The results of the operation will have to be written back to the register file, requiring two or more write ports if the operand A consists of two or more concatenated registers.

SUMMARY OF THE INVENTION

The present invention provides for limiting the necessary concurrent read and write operations to the register file when performing a multiply accumulate (MAC) operation by keeping a frequently used register in a local cache inside the multiply accumulate unit. The present invention saves silicon area and reduces power consumption with a minimum of speed degradation.

A dedicated accumulator cache is implemented in the MAC unit. This cache can temporarily hold one or more register file registers, depending on the maximum width of the accumulator used and the desired size of the cache.

The present invention provides for cache snooping, allowing the MAC apparatus to automatically detect if data hazards occur in the cached registers. Detected hazards may require invalidation or automatic updating of the accumulator cache. In such cases, the system needs to make sure that operations use the variable in the correct location. One example of a data hazard would be if other parts of the microprocessor attempt to write to a register in the register file while this register is temporarily in the accumulator cache.

The accumulator cache is loaded explicitly by control circuitry when a MAC instruction is issued that uses accumulator registers not present in the accumulator caches. In such a case, the accumulator cache is loaded before the MAC instruction is issued. When a MAC instruction is issued, control circuitry determines whether the accumulator cache must be updated. If the cache needs to be updated, the control circuitry will typically add one instruction cycle to the execution of the MAC instruction and use this cycle to copy the source register into the cache. When subsequent MAC instructions are issued, for example in inner loops, the control circuit will most of the time determine that the cache does not need to be updated thereby saving one execution cycle.

Providing a dedicated accumulator register allows the MAC apparatus to keep the accumulator value internally, and further allows the results to be written back to the register file when convenient, resulting in a reduced number of write operations to the register file, thereby significantly reducing power consumption.

To enhance the precision of the MAC unit, the MAC unit will typically have an accumulator wider than a single register. A common configuration is to allow the result of the multiply operation to be 32 bits and to allow the result of the accumulate operation in the MAC to be 40 or more bits. If the result register is wider than a single register, the result may be written back to the register file sequentially, possibly utilizing idle cycles in the processor pipeline.

BRIEF DESCRIPTION OF THE DRAWINGS

The above and other advantages and features of this invention are described in the following detailed description and are shown in the following drawings.

DETAILED DESCRIPTION

This invention relates to an apparatus and method for performing efficient multiply-accumulate operations. The following is a description of exemplary embodiments in accordance with this invention. Where appropriate, components shown on different figures are given the same reference numeral throughout the description.

Figure 1:
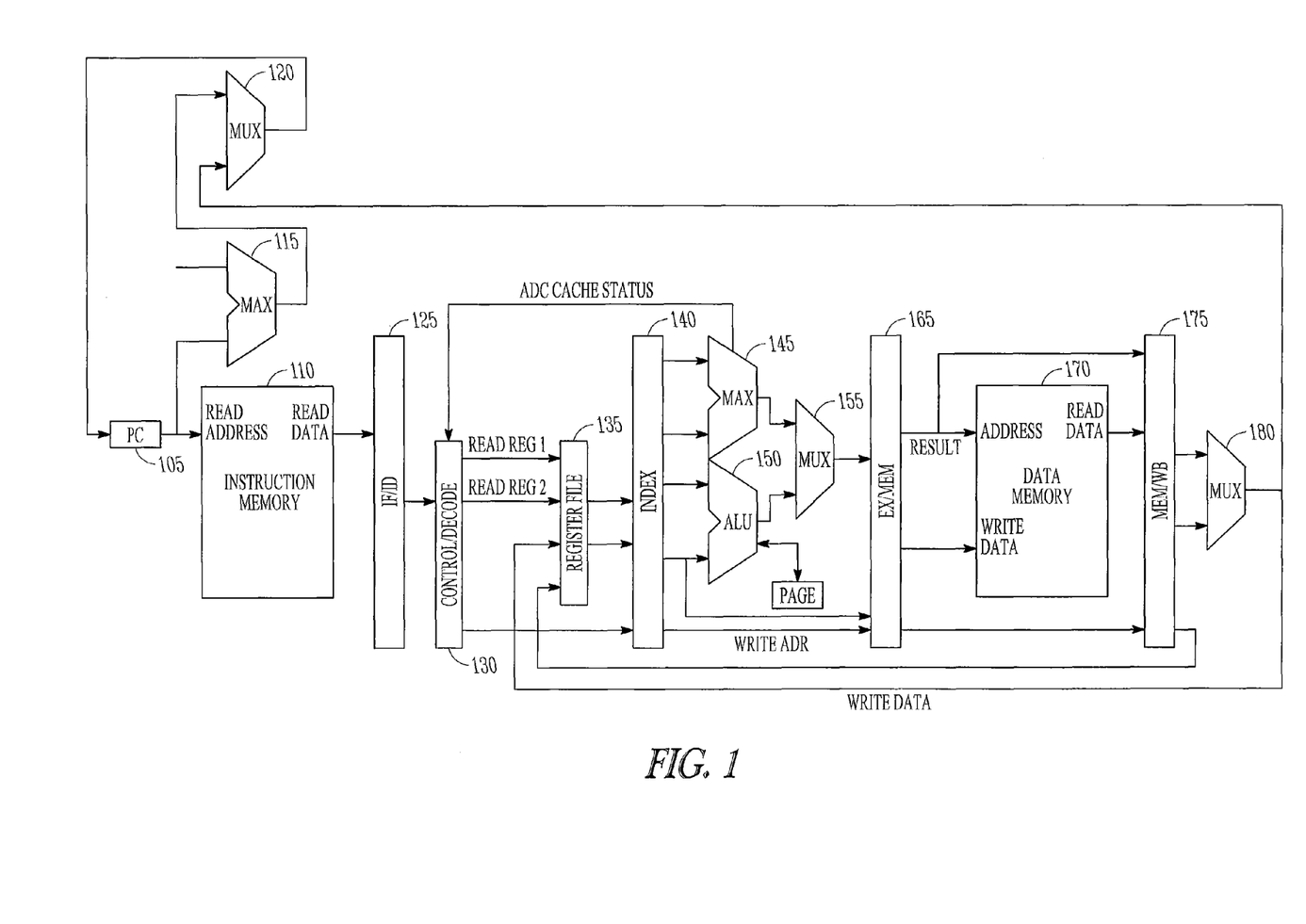
FIG. 1 illustrating a block diagram of an exemplary microprocessor in accordance with this invention.

FIG. 1 illustrates a portion of a microprocessor 100 that performs the process for performing a MAC instruction in accordance with an exemplary embodiment of this invention. One skilled in the art will recognize that some components not essential to understanding of the invention may have been omitted for brevity.

The microprocessor 100 is a pipelined implementation. The pipeline is divided into the following five pipeline stages: Instruction Fetch (IF), Instruction Decode (ID), Execute (EX), Memory Load/Store (MEM), and Write Back (WB). Pipelined implementations help increase the clock frequency of microprocessor 100 by temporarily storing results of logic operation in pipeline registers. This shortens the logic path for an operation to be performed in one clock cycle.

Program counter 105 stores a pointer to the address of the next instruction to be executed by microprocessor 100. Program counter 105 transmits the pointer to instruction memory 110 and adder 115. Instruction memory 110 retrieves the instruction in the address given by the pointer. Adder 115 increments the value of the pointer to the address of the next instruction.

The instruction memory 110 writes the instruction from the address of the pointer into a pipeline register 125 between the IF and the ID for execution. The instruction in pipeline register 125 is read by controller/decoder 130. Controller/decoder 130 processes the instruction and determines which of the register file registers are needed to perform the instructions. The addresses of these registers are sent to the register file 135. The registers are then loaded in the ID/EX registers 140. The data from the registers is then used by MAC circuit 145 and Arithmetic Logic Unit (ALU) 150 to perform the proper logic operations for the instruction. The output of MAC circuit 145 is transmitted to multiplexer 155. MAC circuit 145 also outputs signals over Acc_Cache_Status signal bus that indicate the status of values stored in an accumulator cache to controller/decoder 130. The Acc_Cache_Status signal bus includes a line for each entry in an accumulator cache in MAC circuit 145. ALU 150 outputs a result that is transmitted to multiplexer 155 and any flags generated during computations of the results.

The multiplexer 155 selects the proper output from ALU 150 and MAC 145 and writes the result to the proper output register in EX/MEM pipeline register 165. The result is then either stored in the proper address of data memory 170 or is placed in proper MEM/WB pipeline register 175.

Multiplexer 180 receives outputs from pipeline registers 175 and selects the data to be written back from either data memory 170 or the result of an operation in the execute pipeline stage. All instructions have a destination register as a result. This destination register is located in the register file or in program counter 105. If the destination is in the register file, the output of multiplexer 180 is written to the register file 135. If the destination register is program counter 105, the output of multiplexer 180 is routed to multiplexer 120. Multiplexer 120 receives the outputs from adder 115 and multiplexer 180. Multiplexer 120 then selects the proper output to insert in program counter 105 as the next address to the next instruction.

Figure 2:
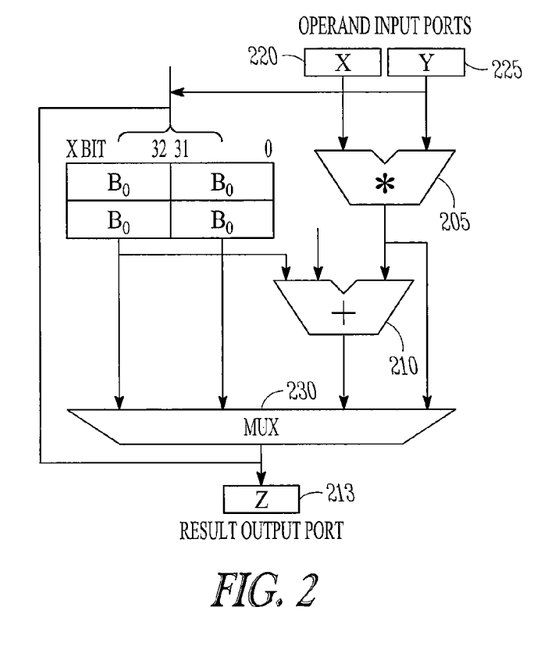
FIG. 2 illustrating an exemplary MAC apparatus in accordance with this invention.

FIG. 2 is a conceptual block diagram of a MAC circuit 145 configured in accordance with this invention. The MAC circuit includes a multiplier 205 and an adder 210 for performing the operations in accordance with this invention. The MAC apparatus includes two operand input ports 220 and 225 for carrying operands for a MAC or multiply operation, and a result output port 215. The input ports 220 and 225 are also used to load the accumulator cache 235.

The MAC circuit 145 also includes an accumulator cache 235. The accumulator cache 235 of FIG. 2 is shown as having two accumulator cache 235 values A and B, though it is to be understood that the accumulator cache 235 may comprise any number of values. In a preferred embodiment, the accumulator cache 235 may contain any number of values, wherein each of the values comprises a width equal to the precision of the operation. The accumulator cache 235 is preferably configured to supply its contents to the adder 210 in a manner disclosed in more detail below.

The outputs of adder 210, multiplier 205, and accumulator cache 235 of the MAC circuit 145 are coupled to a multiplexer 230. Multiplexer 230 provides desired values and results to the result output port 215. It is contemplated that any part of the MAC or multiply result, or any part of the accumulator cache 235, may be output to the result output port 215. The result output port 215 is preferably configured for carrying data to be written back to a register file or forwarding the result to other parts of the microprocessor.

In a preferred embodiment, the multiplier 205 may be configured to produce products wider than the inputs. For example, multiplier 205 may receive input operands having widths of N and M bits and may produce a product of N+M bits, depending on the maximum accumulator width provided.

Figure 3:
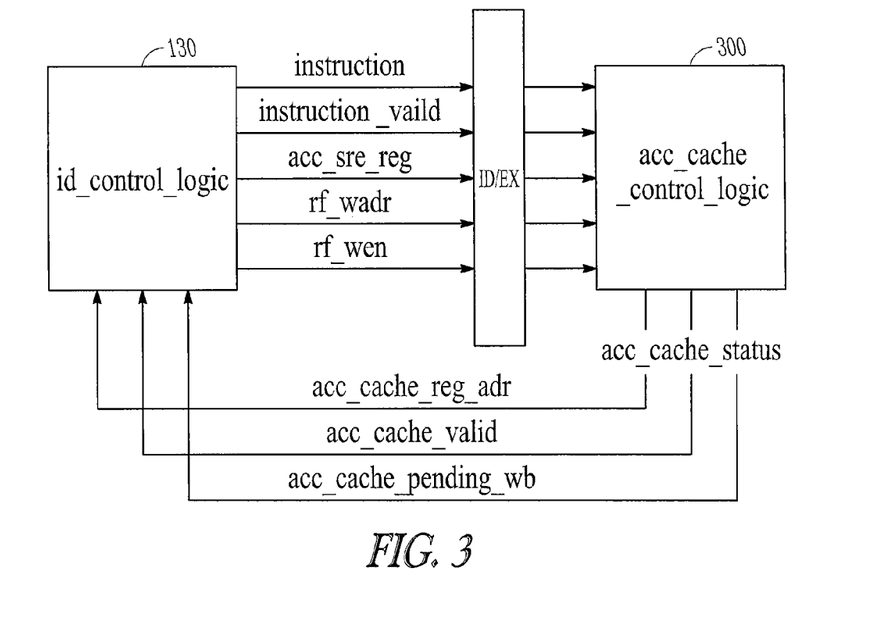
FIG. 3 illustrating a control unit for the MAC apparatus in accordance with this invention.

FIG. 3 illustrates an exemplary control logic 300 for controlling the operation of the MAC circuit 145 in accordance with this invention. It is contemplated that control logic 300 may comprise conventional hardware circuitry for operating MAC circuitry 145. Control logic 300 communicates with the main controller/decoder 130 in the microprocessor 100.

Control logic 300 receives the following signals from controller/decoder 130: instruction signal, an Instruction_Valid signal, an Acc_Src_Reg signal, Rf_Wadr signals and a Rf_Wen signal.

The instruction signals indicate the next instruction for MAC circuit 145 to execute. Since the signals are received via a signal bus distributed to several logic units, control logic 300 must also receive an Instruction_Valid signal that indicates the instruction signals are valid and to be executed by MAC circuitry 145. The Acc_Src_Reg signal indicates the register to be used as the accumulator source register by the MAC operation being performed. When the MAC circuitry 145 loads a value from the register file into the accumulator cache 235, the Acc_Src_Reg signal also indicates where to place the value in the accumulator cache 235 to MAC circuitry 145. The Rf_Wadr signals indicate which register file register is about to be written to by other operations in the pipeline. The Rf_Wen signal indicates if the register address in the Rf_Wadr signals is valid. The Rf_Wadr signal and Rf_Wen signal may also be used to invalidate the accumulator cache 235.

The Acc_Cache_Status signals indicate which register file registers are duplicated in the accumulator cache 235. The Acc_Cache_Status signals also indicate if the entries in the accumulator cache 235 are valid. These signals are then used to the instruction to send to control logic.

Figure 4:
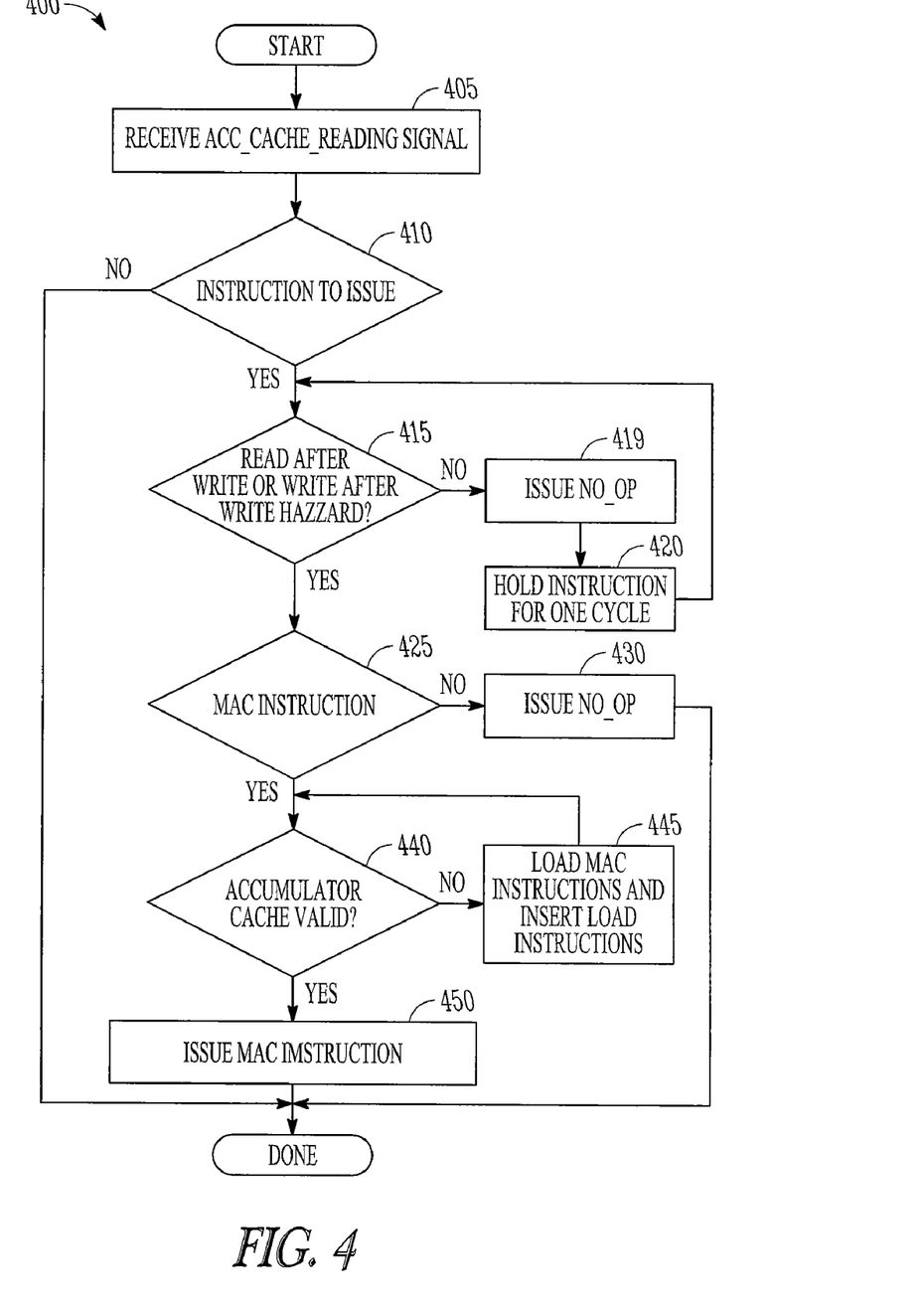
FIG. 4 illustrating an exemplary method for determining whether a read or write hazard will occur in an accumulator cache in accordance with this invention.
Figure 5:
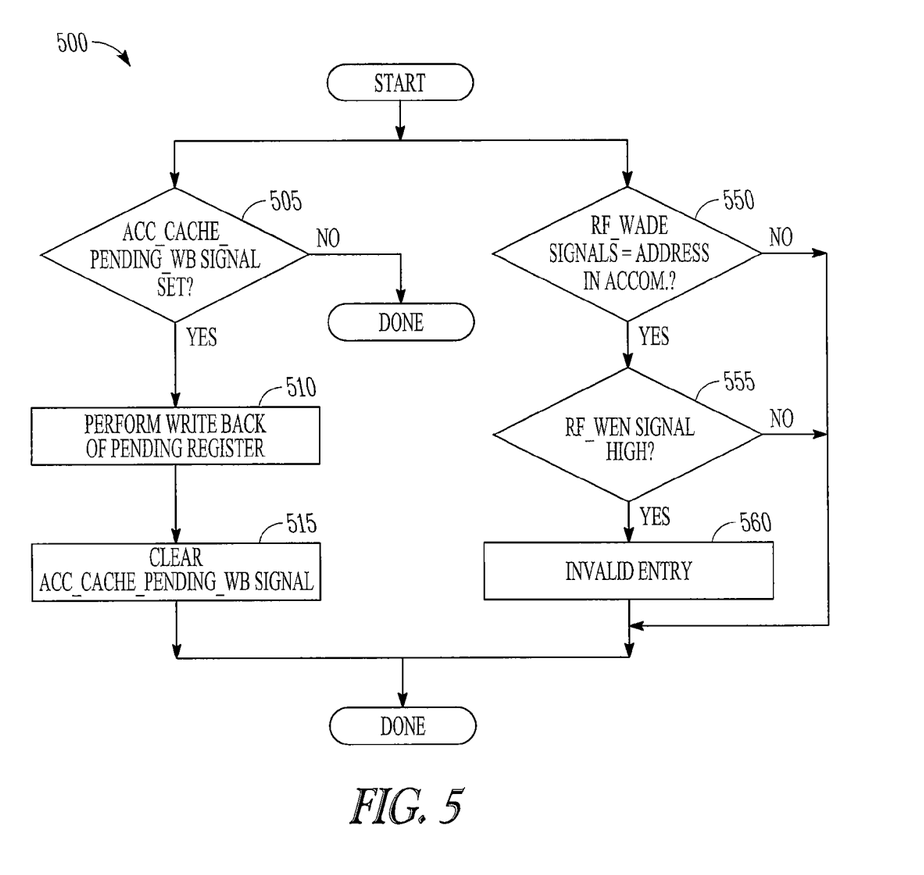
FIG. 5 illustrating an exemplary method for performing a no operation process in accordance with this invention.
Figure 6:
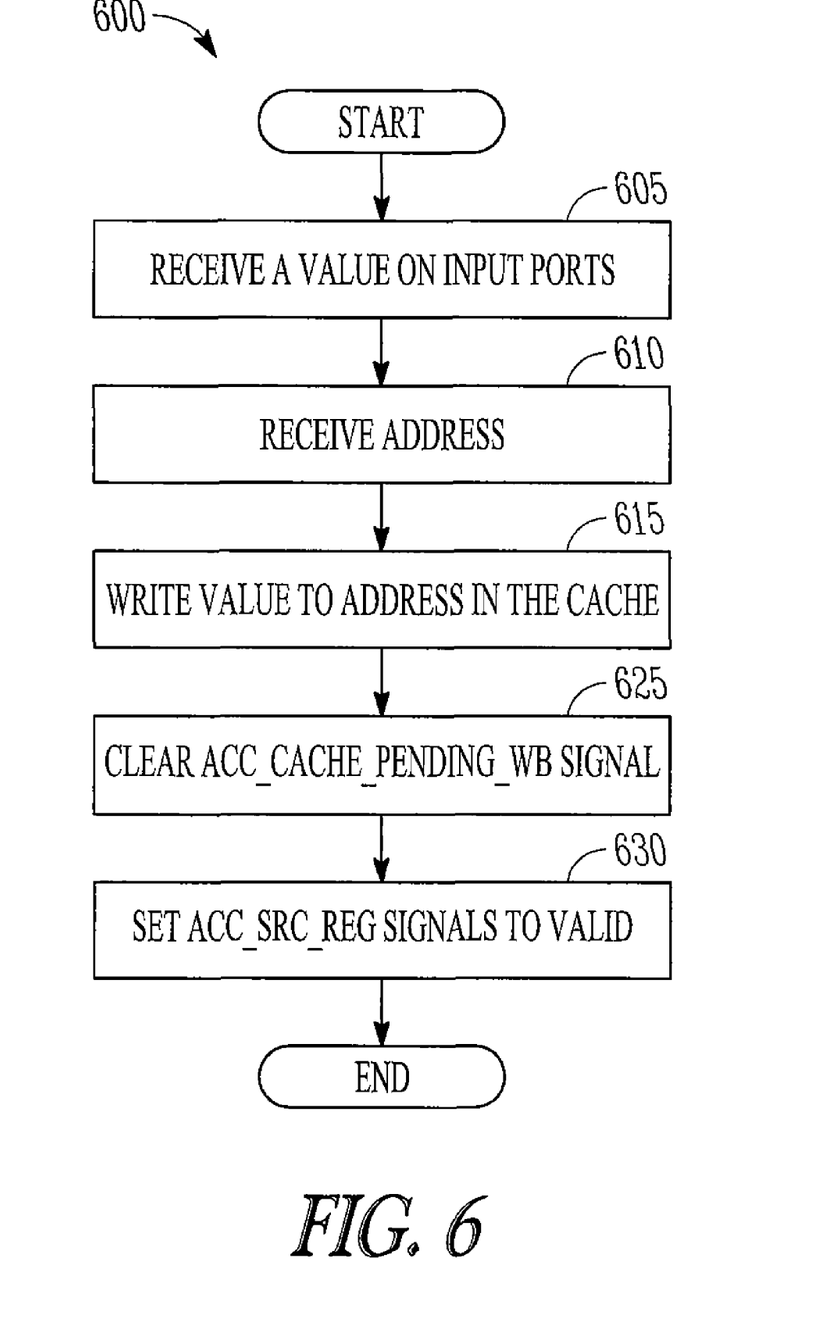
FIG. 6 illustrating an exemplary method for decoding MAC instructions in accordance with this invention.
Figure 7:
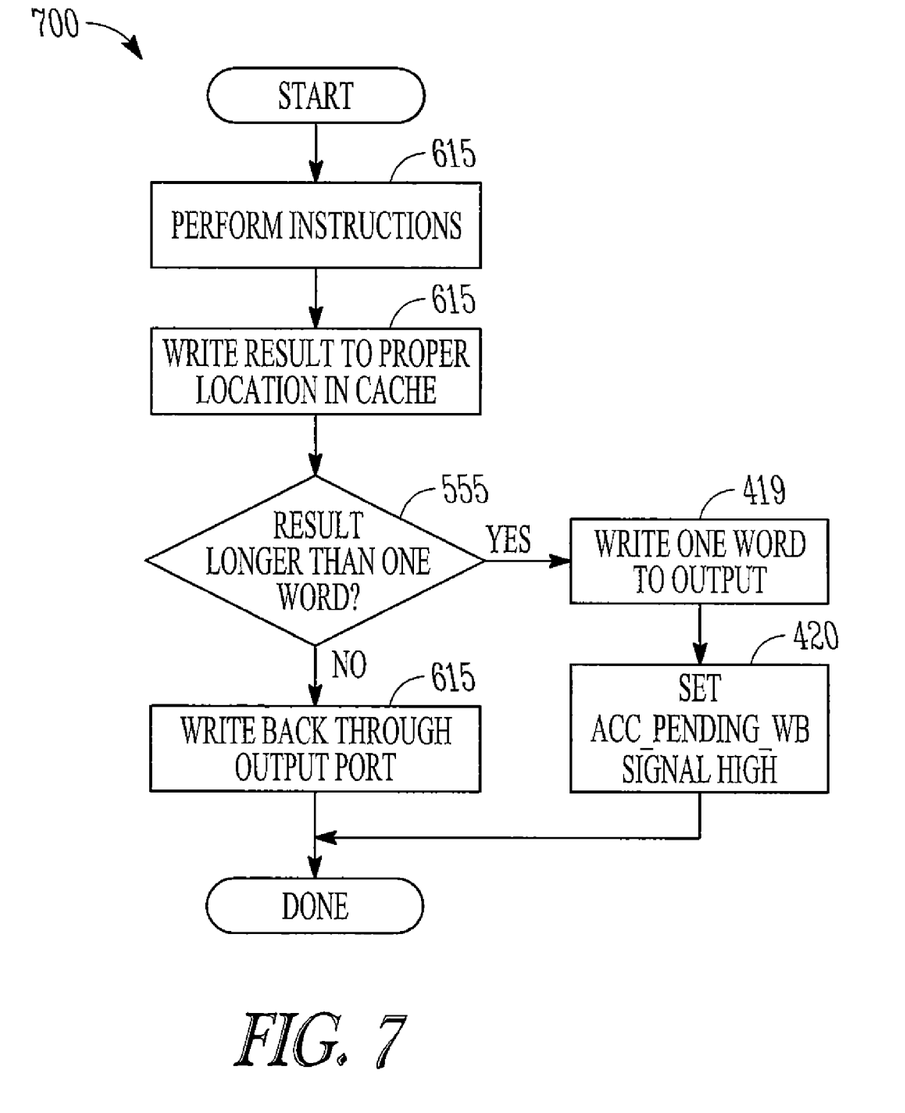
FIG. 7 an exemplary method for performing a MAC instruction in accordance with this invention.

FIGS. 4-7 illustrate flow diagrams of embodiments of processes executed by control logic 240 in response to receiving the various signals. FIG. 4 illustrates Id_Control_Logic process 400 that determines whether a read after write hazard or a write after write hazard will occur and issues an instruction if a hazard will not occur. FIG. 5 illustrates a No_Op process 500 that is executed for all instructions on the instruction bus that are not intended for MAC circuitry 145. FIG. 6 illustrates Acc_Cache_Control_Logic process 600 that decodes instructions generated by Id_Control_Logic process 400. FIG. 7 illustrates process 700 that performs a MAC operation. Exemplary embodiments of these processes are described below.

FIG. 4 illustrates Id_Control_Logic process 400 that detects whether a read after write or a write after write hazard will occur and issues an instruction if a hazard will not occur. These hazards occur in the pipelined logic because a read from or write to register file 135 occurs that may cause invalid data to be used in an operation. Id_Control_Logic process 400 and assures that read and write operations to register file 135 occur in the proper order.

Process 400 begins in step 405 by a determination that the accumulator cache 235 is storing results that have not been written to register file 135. This may be determined by the reception of an Acc_Cache_Pending_Wb signal. In step 410, the control logic determines whether an instruction is about to issue in response to the determination that there is a value in the cache that has not been written to register file 135. If an instruction is not about to issue, process 400 ends.

If an instruction is about to issue, the control unit determines whether the instruction will cause either a read after write hazard or write after write hazard in step 415. If a hazard is detected, the control unit issues a no-op signal in step 419, holds the instruction in the decode stage of the pipeline, and waits to issue the instruction until the correct value is in the register file in step 420. Process 400 is then repeated from step 415 to determine if the hazard is resolved.

If the instruction is not reading a value that does causes a hazard, the control unit determines whether the instruction being decoded is a MAC instruction in step 425. If the instruction is not a MAC instruction, a no operation instruction is issued to MAC circuitry 145 in step 430.

If a MAC instruction is decoded, process 400 determines whether the accumulator cache 235 is valid in step 440. The validity of accumulator cache 235 is determined by asserting the Acc_Cache_Reg_Adr and Acc_Cache_Valid signals for each of the Acc_Cache_Status signal busses. If accumulator cache 235 is not valid, process 400 holds the MAC instruction and inserts a Load_Acc instruction into the pipeline in step 445. After step 445 or if accumulator cache 235 is valid, the MAC instruction then is issued in step 450 and process 400 ends.

FIG. 5 illustrates a no operation process 500 that is performed by control logic 300 when an instruction is received that is not to be performed by MAC circuitry 145. Process 500 has two separate operations performed in parallel. The first operation begins in step 505 in which control logic 300 determines whether the Acc_Cache_Pending_Wb signal is set. If the signal is set, there is a value stored in the accumulator cache 235 from a previous MAC operation that has not been written back to the register file. This occurs when a result of the operation is wider than the operand register. If the Acc_Cache_Pending_Wb signal is not set, process 500 ends. Otherwise, if the signal is set, a write back of the pending register in accumulator cache 235 is performed in step 510. Control logic 300 then clears the Acc_Cache_Pending_Wb signal in step 515 and the operation ends.

In parallel to step 505, snoop logic contained in control logic 300 determines whether there is data in the pipeline that will invalidate a cache entry. To perform this operation, control logic 300 determines if the Rf_Wadr signals are equal to an address in the accumulator cache 235 in step 550. If the signals are not equal to an address in the accumulator cache 235, this part of the process ends. Otherwise, if the Rf_Wadr signals indicate an address in the accumulator cache 235, control unit 300 determines whether the Rf_Wen signal is high in step 555. If the Rf_Wen signal is high, the value at the address in accumulator cache 235 indicated by the Rf_Wadr signals is invalidated. Thus, control unit 300 invalidates the accumulator cache 235 entry in step 560 and the operation ends.

FIG. 6 illustrates a Load_Acc process 600 performed by control logic 300. Process 600 loads a value from register file 135 into the accumulator cache 235 through input ports 220 and 225 of MAC circuitry 145. Process 600 begins in step 605 with receiving a value on input ports 220 and 225. In step 610, the Acc_Src_Reg signals are read for the address in the accumulator cache 235 to receive the value. In step 615, the value is written to the indicated address in the accumulator cache 235. One skilled in the art will recognize that if the accumulator cache 235 is wider than the inputs, the lower bits may be placed on one port with the remaining bits on a second port. For example, if the input ports are 32 bits wide and the accumulator cache 235 is wider than 32 bits, the lower 32 bits may be placed on input port 220 and the remaining upper bits placed on input port 225. In this example, the accumulator cache 235 value is a sign extended twos complement number value sign and the remaining upper bits must be sign extended.

In step 625, control logic 300 then clears the Acc_Cache_Pending_Wb signal for the entry in the accumulator cache 235 that was written to in step 615. Process 600 then ends in step 630 by control logic 300 setting Acc_Cache_Pending_Wb signals for the accumulator cache 235 entry to be valid.

FIG. 7 illustrates a process 700 for performing a MAC instruction. Process 700 begins in step 705 by MAC circuitry 145 performing the instruction. In step 710, the result is written to the proper location in the accumulator cache 235. In step 715, the control logic determines whether the result is longer than one word. If the result is not longer than one word, the result is written to the register file 135 through output port 230 in step 720 and process 700 ends. If the result is longer than one word, one word of the result is written to the register file 135 through output port 215 in step 730. The Acc_Cache_Pending_Wb signal is then set high to wait for the rest of the result to be written to the register file 135 in step 735 and process 700 ends.

In further embodiments, it is contemplated that data loaded into the accumulator cache 235 may include additional information regarding the loaded data. For example, the data may include information regarding the register file addresses of the cached registers, or updating of the valid bits corresponding to the accumulator cache 235 entries.

In some situations, it is contemplated that no accumulator cache 235 entries may be free for the loading of new values. In such a case, the operational logic may be configured to employ a replacement strategy whereby an existing entry may be evicted in favor of the new entries.

In still further embodiments, the control logic may be configured to look ahead and speculatively preload the register in accumulator cache 235 with register values likely to be used in future instructions.

The above describes exemplary embodiments of an apparatus and method for performing efficient multiply-accumulate operation in a microprocessor. Those skilled in the art will recognize that variations may be made which infringe on this invention as set forth in claims below either literally or through the Doctrine of Equivalents.

What is claimed is:

1. An apparatus for performing multiply-accumulate operations in a microprocessor comprising:
   a multiplier having two input ports and an output port;
   an adder having an input port coupled to the output port of the multiplier and having an output port;
   an accumulator cache coupled to the two input ports for receiving at least one value and for storing an accumulator value internal to said apparatus, and having an output port coupled to an input port of the adder;
   a multiplexor having input ports coupled to the output of the multiplier, the output of the adder, and the output ports of the accumulator cache, and having an output port coupled to the input ports of the accumulator cache; and control circuitry for controlling the operation of said apparatus.

2. The apparatus of claim 1, wherein said control circuitry is configured to:

determine an operation requires said accumulator cache, determine an instruction is about to issue, determine whether said instruction causes a read or a write hazard, determine whether the instruction is a multiply accumulate instruction responsive to a determination that said instruction does not cause a read or a write hazard, determine whether said accumulator cache is valid, and issuing said instruction responsive to a determination said accumulator cache is valid.

3. The apparatus of claim 2 wherein said control circuitry is configured to issue a no operation signal and hold said instruction for one cycle responsive to a determination that said instruction will cause a hazard.

4. The apparatus of claim 2 wherein said control circuitry is configured to issue a no operation signal responsive to a determination that said instruction is not a multiply accumulate instruction.

5. The apparatus of claim 2 wherein said control circuitry is configured to hold said instruction and issue a load instruction.

6. The apparatus of claim 2 wherein said control circuitry is configured to perform a no operation process by determining whether a write back from the accumulator cache to memory is pending, and performing a write back of a pending register in said accumulator cache to memory in response to the determination that a write back is pending.

7. The apparatus of claim 2 wherein said control circuitry is configured to perform an operation by determining whether a value from a previous operation stored in said cache and invalidating said value.

8. The apparatus of claim 2 wherein said control circuitry is configured to load an address in said accumulator cache by receiving an input, receiving an address, writing said value in said accumulator cache at said address, clear a cache write pending signal, and set signals indicating a value in said accumulator is valid.

9. The apparatus of claim 2 wherein said control circuitry is further configured to write a result of said instruction to a proper address in said accumulator cache.

10. The apparatus of claim 9 wherein said control circuitry is further configured to determine whether said result is longer than one word, writing a lower portion of said result to an output responsive to a determination that said result is longer than one word, and set a write back pending signal.

11. The apparatus of claim 1 wherein values from both input ports are loaded into the cache.

12. The apparatus of claim 11 wherein the at least one value has lower bits and upper bits, and wherein the lower bits are loaded into the cache from one port and upper bits are loaded into the cache from the other port.

13. An apparatus for performing multiply-accumulate operations in a microprocessor comprising:

a multiplier and an adder to produce an accumulator value, the multiplier having an output port and the adder having an input port coupled to the output port of the multiplier and having an output port;

an arithmetic logic unit to perform mathematical calculations;

a multiplexer having input ports coupled to the output of the multiplier and the output of the adder to receive results from the adder and the multiplier and provide selected results to a register;

an accumulator cache having an input coupled to inputs of the multiplier, and output ports coupled to an input of the adder and coupled to an input of the multiplexer, for storing an accumulator value internal to said apparatus; and control circuitry for controlling the operation of said apparatus.

* * * * *